United States Patent
Abadi et al.

(10) Patent No.: US 12,499,389 B2
(45) Date of Patent: Dec. 16, 2025

(54) BIAS DETECTION TECHNIQUE IN A DATA-DRIVEN MODEL FOR MULTIPLE TENANTS

(71) Applicant: NCR Voyix Corporation, Atlanta, GA (US)

(72) Inventors: Shiran Abadi, Tel-Aviv (IL); Amit Botzer, Haifa (IL); Tamar Miriam Haizler, Kfar-Saba (IL)

(73) Assignee: NCR Voyix Corporation, Atlanta, GA (US)

( * ) Notice: Subject to any disclaimer, the term of this patent is extended or adjusted under 35 U.S.C. 154(b) by 838 days.

(21) Appl. No.: 17/713,420

(22) Filed: Apr. 5, 2022

(65) Prior Publication Data

US 2023/0316154 A1 Oct. 5, 2023

(51) Int. Cl.
*G06N 20/20* (2019.01)
*G06F 16/2455* (2019.01)
*G06F 18/214* (2023.01)

(52) U.S. Cl.
CPC ....... *G06N 20/20* (2019.01); *G06F 16/24556* (2019.01); *G06F 18/214* (2023.01)

(58) Field of Classification Search
None
See application file for complete search history.

(56) References Cited

U.S. PATENT DOCUMENTS

| | | | |
|---|---|---|---|
| 9,460,169 B2 * | 10/2016 | Hinton | G06F 16/25 |
| 10,783,399 B1 * | 9/2020 | Bruno | G06F 16/45 |
| 2018/0197111 A1 * | 7/2018 | Crabtree | G06F 16/215 |
| 2019/0354850 A1 * | 11/2019 | Watson | G06N 3/045 |
| 2021/0141995 A1 * | 5/2021 | Lundgaard | G06V 10/40 |
| 2022/0187847 A1 * | 6/2022 | Cella | G06Q 10/06395 |
| 2023/0103395 A1 * | 4/2023 | Guo | G06V 10/774 |
| | | | 726/26 |
| 2023/0222597 A1 * | 7/2023 | Routray | G06N 3/044 |
| | | | 705/4 |
| 2023/0267468 A1 * | 8/2023 | Tholar | G06Q 90/00 |
| | | | 706/12 |

OTHER PUBLICATIONS

Pagano et al., "Bias and Unfairness in Machine Learning Models: A Systematic Literature Review," Feb. 16, 2022, https://arxiv.org/abs/2202.08176v1.*

* cited by examiner

*Primary Examiner* — Ryan Barrett
(74) *Attorney, Agent, or Firm* — Schwegman Lundberg & Woessner, P.A.

(57) ABSTRACT

A first dataset associated with input data provided to a data-driven machine-learning model (MLM) that provides a service to a first tenant is obtained. A second dataset is obtained for a second tenant. Each set of input data from the datasets are labeled with an identifier for the first tenant or the second tenant. The first dataset and second dataset are aggregated into a training dataset to train a classification MLM to classify each set of input data as originating from the first tenant or the second tenant. The classification MLM is tested for accuracy. Based on the accuracy of the classification MLM, a determination is provided as to whether the data-driven MLM can be used with the second tenant without adjustments to the data-driven MLM or as to whether adjustments to the data-driven MLM are needed before using the data-driven MLM.

20 Claims, 3 Drawing Sheets

BIAS DETECTION TECHNIQUE IN A DATA-DRIVEN MODEL FOR MULTIPLE TENANTS

BACKGROUND

When developing a data-driven model, it is often designed according to a single tenant with the intention of later applying it to new tenants. However, the characteristics of tenants vary and therefore the model may be incompatible for the new tenants.

The problem becomes that the data-driven model works well with data used as input to the model on the original tenant for which it was designed but may or may not work very well for newly added tenants that may have different characteristics associated with their data from that which is associated with the original tenant.

For example, suppose a data model is designed to identify fraudulent transactions according to data captured by an original tenant. The model identifies fraudulent cashiers according to properties on the data in which it was trained (properties and data values associated with transactions processed by the original tenant). The properties include price overrides, voided items, voided transactions, sales total dollar amounts, return transactions, etc. Cashiers for whom one of the properties, or a combination of them, is significantly different from other cashiers are tagged as potential fraudulent behavior. For example, since all cashiers are allowed and equivalently likely to process return transactions, a given cashier that processes significantly more return transactions relative to a total number of transactions processed by the given cashier when compared to an average cashier's return transactions relative to the average cashier's total number of transactions will result in the given cashier being flagged as being a fraudster. When a new tenant is in need of using the service to detect fraudulent cashiers, the same properties are collected from the new tenant and fed as input to the model. However, for the new tenant, only a minority of the cashiers are authorized to process returns. Thus, while the model fitted for the original tenant compares all cashiers and points out those having significantly more return transactions, the same model that is fitted to the new tenant will point out only the minority of cashiers that are authorized to process return transactions as potential risks. Notably, those cashiers of the new tenant are not valid candidates as they are the only ones that are authorized to process the return transactions for the new tenant. Hence, such false detections obscure the actual cashiers that put the new tenant at risk (due to other properties such as a high proportion of voided transactions).

As another example, suppose an original store utilizes a new model, according to which all loyal customers are given a 5% discount on the store's deli-offered lunches in order to promote loyalty membership. Since the membership subscription rate significantly rises in the original store, the retailer decides to apply this model to a second store. However, the original store is located in proximity to many offices where many workers come to purchase their lunches. In contrast, the new store is located in a residential area, where the people mostly cook lunch from home and do not purchase lunch at the same rate as occurs with the original store. Thus, the new model may attract new loyalty memberships in the original store but not in the new store.

The two examples, among many others, are developed according to one tenant but must be adjusted in order for it to be applicable to a different tenant. To this end, the features (data properties or characteristics) of the two tenants must be manually compared and analyzed before a decision is made to use the same data model for both tenants. Since the relevant features of the input data to the model are not easily identified among complex interactions of all possible properties, a bias detection technique is needed to compare the tenants and to identify the varying properties.

SUMMARY

In various embodiments, system and a method for a bias detection technique in a data-driven model for multiple tenants are presented.

According to an aspect, a method for bias detection in a data-driven model for multiple tenants is presented. A first dataset associated with first sets of input data used by a data-driven machine-learning model (MLM) is obtained. A second dataset associated with second sets of input data that is proposed to be used with the data-driven MLM is obtained. The first sets of input data are labeled with a first tenant identifier for a first tenant. The second sets of input data are labeled with a second tenant identifier for a second tenant. The first dataset and the second dataset are aggregated into an aggregated dataset. A classification MLM is derived to classify input data corresponding to the aggregated dataset as belonging to the first tenant identifier or the second tenant identifier. A portion of the input data corresponding to the aggregated dataset is tested against the classification MLM for an accuracy rate in correctly identifying the corresponding input data as belonging to the first tenant identifier or the second tenant identifier. A determination is made based on the accuracy rate as to whether the second dataset for the second tenant can be used with the data-driven MLM.

DETAILED DESCRIPTION

Figure 1:
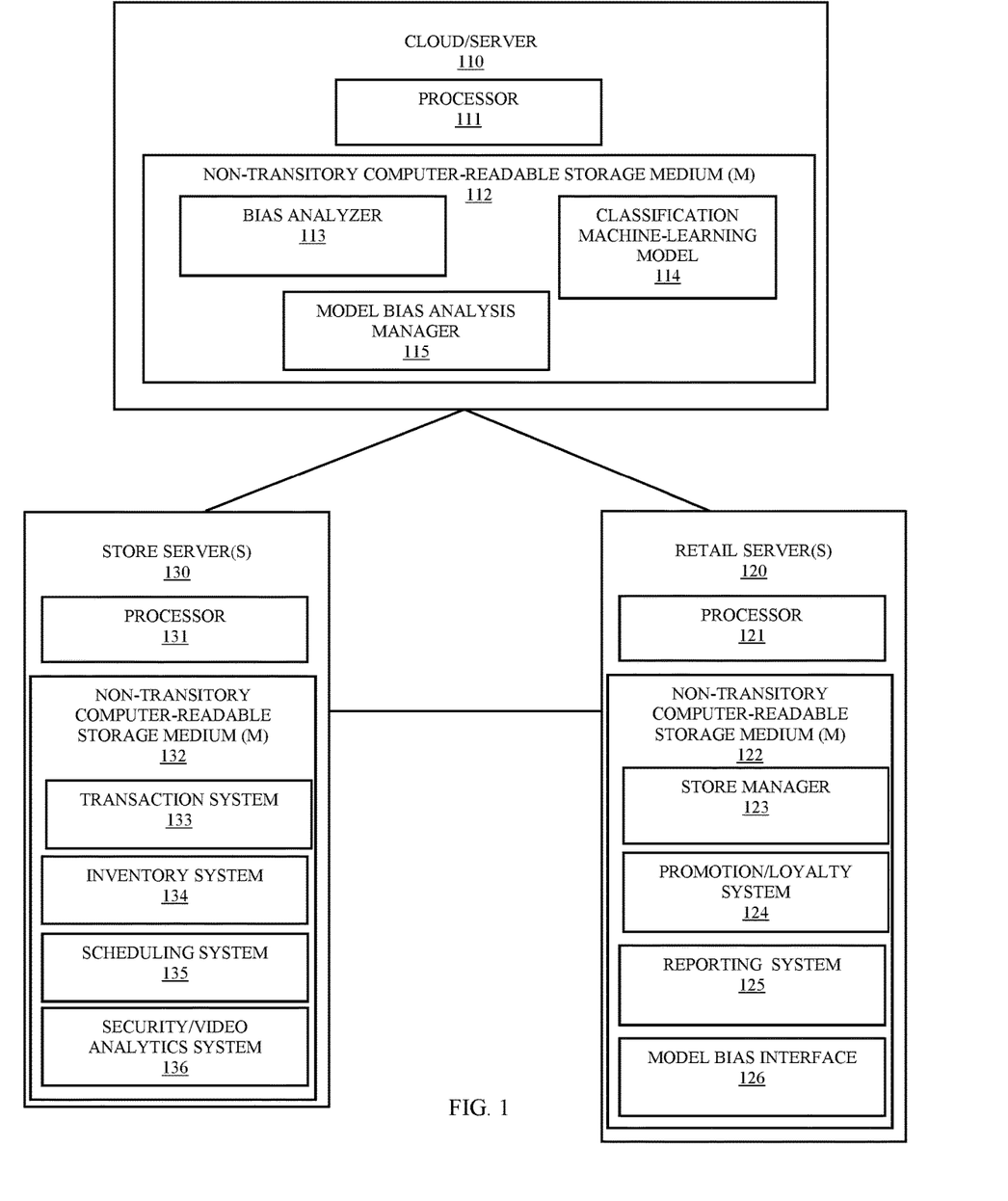
FIG. 1 is a diagram of a system for bias detection in a data-driven model for multiple tenants, according to an example embodiment.

FIG. 1 is a diagram of a system 100 for bias detection in a data-driven model for multiple tenants, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of bias detection in a data-driven model for multiple tenants presented herein and below.

System 100 receives a data model associated with a given retailer service (fraud detection, promotions, theft detection, inventory predictions, etc.). A first dataset from an original tenant for which the data model was designed is obtained and second dataset for a new tenant that the retailer desires to provide the service through the data model is obtained.

The first dataset and second data are sampled. Each sample comprises a set of input data used with the original data model. Each sample is also labeled as originating from the original tenant or the new tenant. Re-sampling, samples weighing, or other methods are employed to reach a balance between the samples from the first dataset and the samples from the second dataset (to avoid a bias towards the original tenant for which more data is available because the data model was designed for the original tenant). The labeled samples are combined into a single training dataset. A machine-learning classification model is trained on the training dataset to predict whether a given sample of input data from the training dataset can be predicted to have originated from the original tenant or the new tenant. Additional samples are obtained from the training dataset and combined into a single testing dataset that is provided to the classification model as input. The classification model produces a classification for each sample (set of input data used with the data model) of the testing dataset as output. The model's classification is compared against the known source for each sample to determine an accuracy rate of the classification model in successfully distinguishing the samples as originating from the original tenant and the new tenant.

When the accuracy rate is below a threshold amount, the classification model is unable to distinguish between the input data of the original tenant and the new tenant. A low accuracy rate is an indication that the original data-driven model does not distinguish between input data originating from the original tenant or the new tenant. This indicates that the multidimensional distribution of features in the input data provided to the original model by the original tenant is quite similar to the input data that will be provided by the new tenant to the original data-driven model. Thus, a low accuracy rate is an indication that the original data-driven model will work well in providing the service to the new tenant. The retailer can safely deploy the service that utilizes the original data-driven model to the new tenant.

When the accuracy rate is above the threshold amount, this indicates that the classification model was able to distinguish between the original tenant and the new tenant, then the original data-driven model suffers from overfitting or bias towards the input data provided by the original client and the original data-driven model needs to be adjusted before the new tenant can be successful in using the data-driven data model for the given service of the retailer.

In embodiment, when the accuracy rate is above the threshold amount, a Random Forest classification machine-learning model is processed as the classification model to provide a feature importance value to each feature of the input data in the samples. This identifies the likely features that are overweighted or biased in the original data-driven model for the input data of the original tenant, the weighting or importance of these features need adjusted in the original data-driven model before the model can be employed by the new tenant for use with the retailer's service.

As used herein, "input data" refers to a set of data or a record of data that is used as input parameters to a given data-driven machine-learning model of a retailer. The term "sample," when used as a noun, may be used interchangeably and synonymously with the phrase "input data" herein and below.

A "feature" of the input data refers to a data type or a data characteristic present in the input data. The input data comprises multiple features. For example, price overrides, voided items, voided transactions, return transactions, sales total amount, any unique data type or field used within the input data that is provided to a given data-driven machine-learning model of a retailer as input parameters.

A "data-driven model" refers to a machine-learning model that is trained to provide a service that identifies or predicts such things as fraud events, promotions, recommendations, theft events, security events, inventory events, etc. based on input data provided by an original tenant.

A "tenant" refers to a source of input data provided to a given data-driven model or desired to be a source of the input data that is going to be provided to the given data-driven model. A tenant may be client device (such as a specific transaction terminal, a store server, etc.) or a tenant may be a set of devices comprised within a given store or a customer grouping of stores. The tenant generates, obtains, and produces the input data.

An "accuracy rate" refers to the total number of correctly classified sources of input data (tenants) divided by the actual number of input datasets. For example, if a dataset comprised 5 input data records/sets and the number of correctly classified sources by a machine-learning classifier model is 2, the accuracy rate is 2/5 or 40%. If the machine-learning classifier correctly classified all 5 input datasets/records, then the accuracy rate is 100% (5/5).

It is within the above-noted context that system 100 is discussed with reference to FIG. 1.

System 100 comprises a cloud/server 110, retail servers 120, and store servers 130.

Cloud/Server 100 comprises a processor 111 and a non-transitory computer-readable storage medium 112. Medium 112 comprises executable instructions for a bias analyzer 113, a classification machine-learning model (MLM) 114, and a model bias analysis manager 115. Processor 111 obtains or is provided the executable instructions from medium 112 causing processor 111 to perform operations discussed herein and below with respect to 113-115.

Each retail server 120 comprises a processor 121 and a non-transitory computer-readable storage medium 122. Medium 112 comprises executable instructions for a store manager 123, a promotion/loyalty system 124, a reporting system 125, and a model bias interface 126. Processor 121 obtains or is provided the executable instructions from medium 122 causing processor 121 to perform operations discussed herein and below with respect to 123-126.

Each store server 130 comprises a processor 131 and a non-transitory computer-readable storage medium 132. Medium 132 comprises executable instructions for a transaction system 133, an inventory system 134, a scheduling system 135, and a security/video analytics system 136.

During operation, model bias interface 126 interacts with model bias analysis manager 115 to identify a given data-driven MLM, provide access to a first dataset comprising input data used by the given data-driven MLM as input parameters from a first store (first tenant) to provide a service to the first tenant, and provide access to a second dataset comprising input data associated with a second store (second tenant) that the retailer desires to provide the service through the given data-driven MLM using the input data of the second store.

Model bias analysis manager 115 interacts with bias analyzer to provide the first dataset associated with the first tenant (first store) and the second dataset associated with the second tenant (second store). The first dataset is labeled for each set of input data to include a label for the first store and the second dataset is labeled for each set of input data to include a label for the second store. The first and second datasets are combined into an aggregated dataset and sampled into a training dataset. The training dataset is used to train and derive classification MLM 114. The training dataset is then further sampled and fed as a testing dataset to the classification MLM 114. Each set of input data (sample) of the testing dataset is provided a classification from the classification MLM 114 as to whether each sample is classified as originating from the first tenant or the second tenant. Bias analyzer 113 calculates an accuracy rate from the correctly identified classifications identified as output from the classification MLM 114 versus the total number of samples provided in the testing dataset.

Bias analyzer 113 provides the accuracy rate to model bias analysis manager 115. Model bias analysis manager 115 compares the accuracy rate to one or more predefined threshold accuracy rates and determines based on the comparison whether the given data-driven MLM for the retailer service will work and provide the same degree of service to the second tenant as it currently does to the first tenant. A high accuracy rate (as compared to the one or more threshold accuracy rates) indicates a high-degree of variability in values of the features for the input data of the first tenant versus the second tenant, such that classifier 114 was able to correctly identify a given sample as originating with the first tenant or the second tenant. This indicates that the given data-driven model associated with the retailer will likely not provide an acceptable level of service when provided input data from the second tenant. Conversely, a low accuracy rate (as compared to the one or more threshold accuracy rates) indicates a low degree of variability or a same or similar multidimensional feature distribution in values of the features for the input data of the first tenant and the second tenant. This indicates that the given data-driven model associated with the retailer will likely provide an acceptable level of service when provided input data from the second tenant.

Model bias analysis manager 115 provides a result back to the model bias interface with an indication as to whether the second tenant can reliably use the service based on the input data of the second tenant.

In an embodiment, the classification MLM 114 is a Random Forest classifier that also provides a feature weighting back with the classification of the testing dataset samples. Bias analyzer 113 provides the feature weights for each feature associated with the input data of the first tenant and the second tenant to model bias analysis manager 115. When the accuracy rate for the testing dataset is at or above the one or more threshold accuracy rates, model bias analysis manager 115 indicates to the model bias interface 126 that the given data-driven model should not be used with the input data of the second tenant and provides a feature or a set of features from the input data that is most likely going to bias the given data-driven model. The feature or the set of features can then be used to adjust the given data-driven model such that predictions provided by the data-driven model are not biased based on the feature or the set of features.

In an embodiment, the first dataset from the first tenant can be obtained directly by bias analysis manager 115 from transaction system 133, inventory system 134, scheduling system 135, and/or security/video analytics system 136 for a first store server 130 associated with the first tenant.

In an embodiment, the second dataset from the second tenant can be obtained directly by bias analysis manager 115 from transaction system 133, inventory system 134, scheduling system 135, and/or security/video analytics system 136 for a second store server 130 associated with the second tenant.

In an embodiment, the first dataset and the second dataset are acquired by the bias analysis manager 115 from store manager 123, promotion/loyalty system 124, and/or reporting system 125 for both the first tenant and the second tenant.

In an embodiment, a first portion of the first dataset and the second dataset is acquired by the bias analysis manager 115 from the corresponding system (133-136) of the corresponding store server 130 for the first tenant and the second tenant and a second portion of the first dataset and the second dataset is acquired by bias analysis manager 115 from 123-125 of the retailer server 120 for the retailer for the first tenant and the second tenant.

In an embodiment, all or some portion of the first dataset and the second dataset is maintained on and directly accessible from one or more data stores on cloud/server 110. In this embodiment, data associated with the input data of the store servers 130 and of retail server 120 are managed by and maintained on cloud/server 110 on behalf of the retailer. In an embodiment, systems 133-136 and 124-125 are provided through cloud/server 110 to store servers 130, store transaction terminals, and retail server 120.

In an embodiment, transaction terminals of stores are interfaced to the store servers 130 for access to systems 133-136. The transaction terminals may comprise Self-Service Terminals (SST), Point-Of-Sale (POS) terminals, Automated Teller Machines (ATMs), and/or kiosks.

In an embodiment, the model bias interface 126 is provided through browser-pages hosted by cloud/server 110 within a browser of retailer server 120 and/or model bias interface 126 is provided as an application for access by the retail server 120 or for access on a mobile device operated by an authorized user of the retailer.

In an embodiment, system 100 is provided to a given retailer associated with retail server 120 as a Software-as-a-Service (SaaS), such that model bias interface 126 is accessible from other interfaces associated with other services provided by cloud/server 100 to the retailer.

The above-referenced embodiments and other embodiments are now discussed with reference to FIGS. 2-3.

Figure 2:
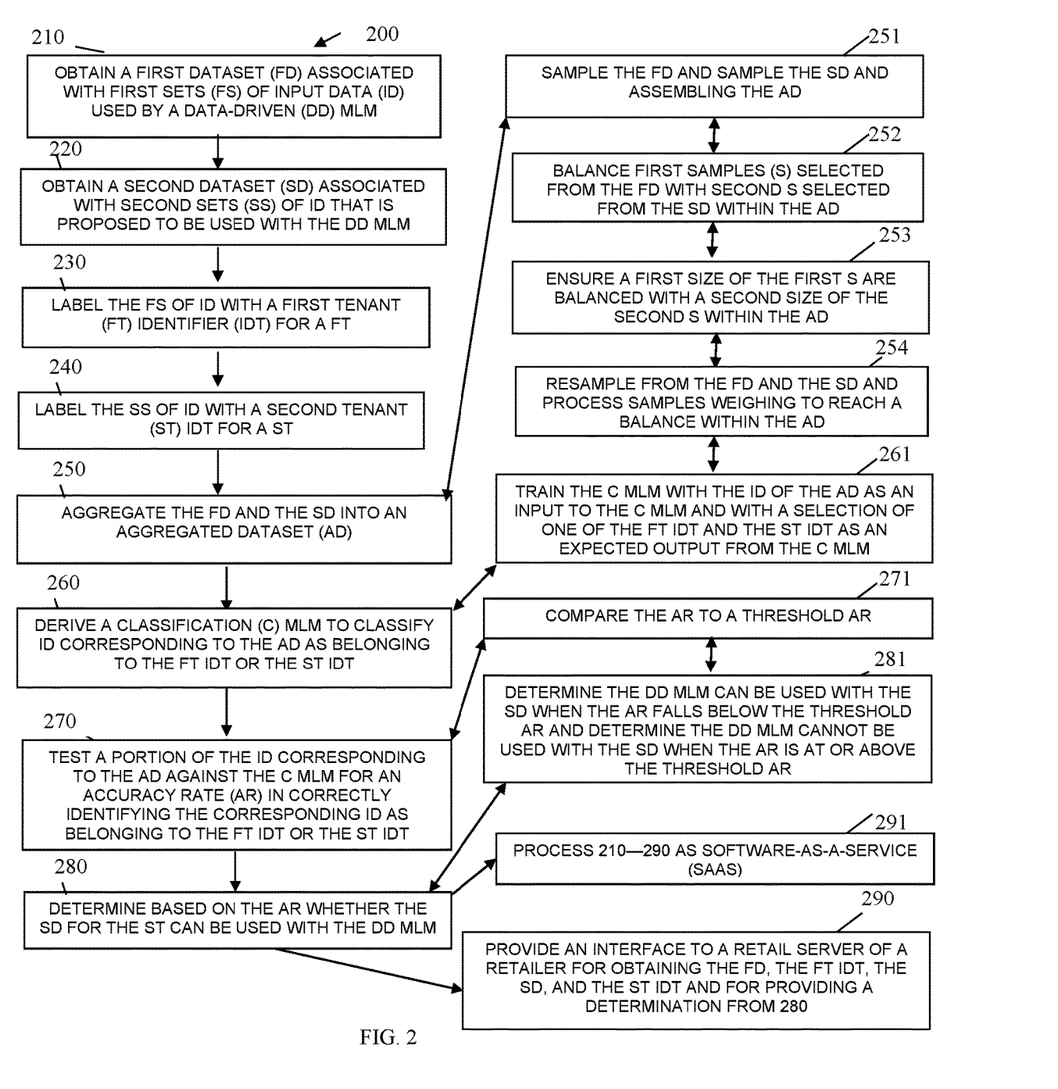
FIG. 2 is a diagram of a method for bias detection in a data-driven model for multiple tenants, according to an example embodiment.

FIG. 2 is a diagram of a method 200 for bias detection in a data-driven model for multiple tenants, according to an example embodiment. The software module(s) that implements the method 200 is referred to as a "data model bias determination service." The data model bias determination service is implemented as executable instructions programmed and residing within memory and/or a non-transitory computer-readable (processor-readable) storage medium and executed by one or more processors of one or more devices. The processor(s) of the device(s) that executes the data model bias determination service are specifically configured and programmed to process the data model bias determination service. The data model bias determination service has access to one or more network connections during its processing. The connections can be wired, wireless, or a combination of wired and wireless.

In an embodiment, the device that executes the data model bias determination service is cloud 110. In an embodiment, the device that executes data model bias determination service is server 110.

In an embodiment, the data model bias determination service is all of, or some combination of bias analyzer 113, classification MLM 114, and/or model bias analysis manager 115.

In an embodiment, the data model bias determination service is provided to a retail server 120 and/or a store server 130 as a SaaS.

At 210, the data model bias determination service obtains a first dataset associated with first sets of input data used by a data-driven MLM.

At 220, the data model bias determination service obtains a second dataset associated with second sets of the input data that is proposed to be used with the data-driven MLM.

At 230, the data model bias determination service labels the first set of input data with a first tenant identifier for the first tenant;

At 240, the data model bias determination service labels the second set of input data with a second tenant identifier for a second tenant.

At 250, the data model bias determination service aggregates the first dataset and the second dataset into an aggregated dataset.

In an embodiment, at 251, the data model bias determination service samples the first dataset and samples the second dataset and assembles the aggregated dataset.

In an embodiment of 251 and at 252, the data model bias determination service balances first samples selected from the first dataset with second samples selected from the second dataset within the aggregated dataset.

In an embodiment of 252 and at 253, the data model bias determination service ensures a first size of the first samples are balanced with a second size of the second samples within the aggregated dataset.

In an embodiment of 253 and at 254, the data model bias determination service resamples from the first dataset and the second dataset and processes samples weighing to reach a balance within the aggregated dataset.

At 260, the data model bias determination service derives a classification MLM 114 to classify input data corresponding to the aggregated dataset as belonging to the first tenant identifier or the second tenant identifier.

In an embodiment of 254 and 260, at 261, the data model bias determination service trains the classification MLM 114 with the input data of the aggregated dataset and with a selection of one of the first tenant identifier and the second tenant identifier as an expected output from the classification MLM 114.

At 270, the data model bias determination service test a portion of the input data corresponding to the aggregated dataset against the classification MLM 114 for an accuracy rate in correctly identifying the corresponding input data as belonging to the first tenant identifier or the second tenant identifier.

In an embodiment, at 271, the data model bias determination service compares the accuracy rate to a threshold accuracy rate.

At 280, the data model bias determination service determines based on the accuracy rate whether the second dataset for the second tenant can be used with the data-driven MLM In an embodiment of 271 and 280, at 281, the data model bias determination service determines the data-driven MLM can be used with the second dataset of the second tenant when the accuracy rate falls below a threshold accuracy rate and determines the data-driven MLM cannot be used with the second dataset when the accuracy rate is at or above the threshold accuracy rate.

In an embodiment, at 290, the data model bias determination service provides an interface to a retail server 120 of a retailer for obtaining the first dataset, the first tenant identifier, the second dataset, and the second tenant identifier and for providing back to the retailer a determination made at 280.

In an embodiment, at 291, the data model bias determination service processes as SaaS to a retailer or store system (133-136 and/or 124-125).

Figure 3:
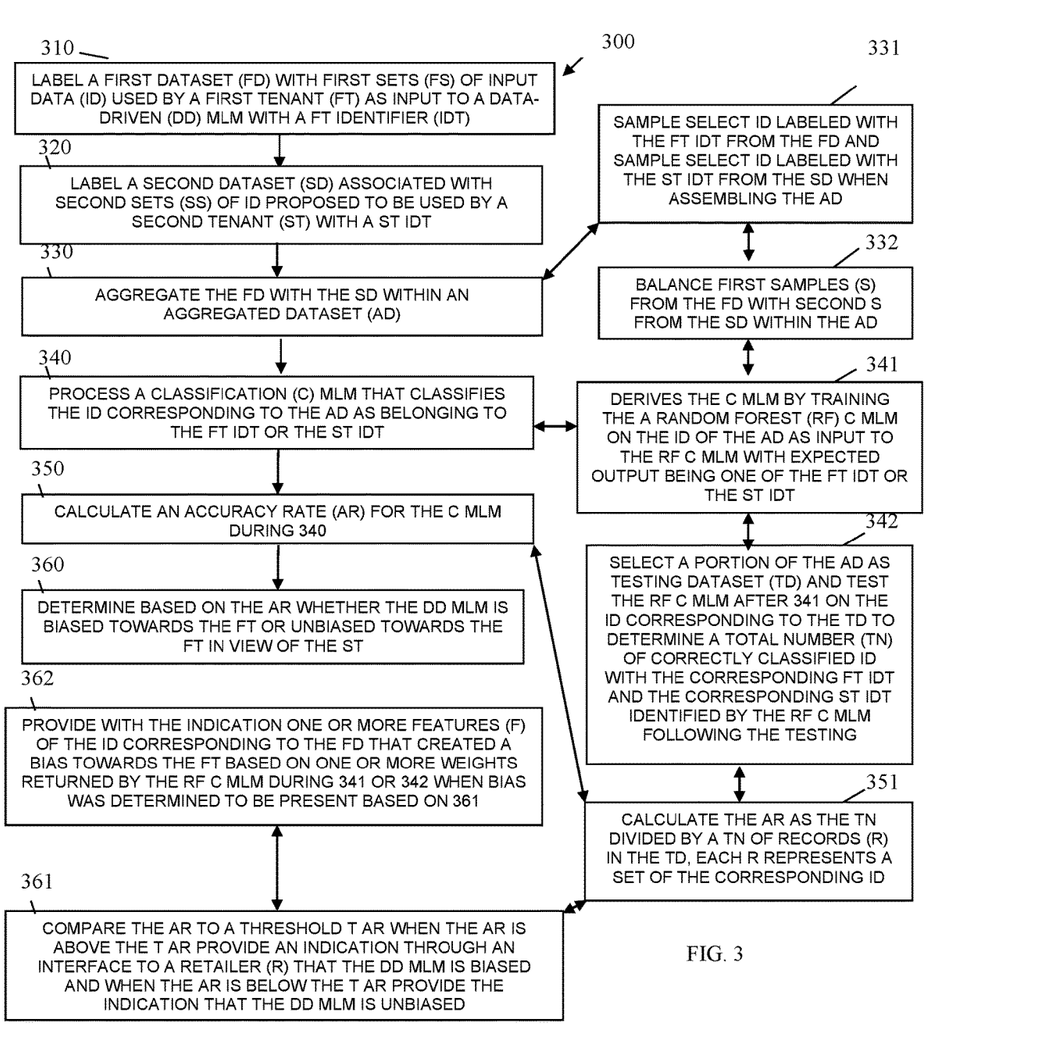
FIG. 3 is a diagram of another method for bias detection in a data-driven model for multiple tenants, according to an example embodiment.

FIG. 3 is a diagram of another method 300 for bias detection in a data-driven model for multiple tenants, according to an example embodiment. The software module (s) that implements the method 300 is referred to as a "data-driven MLM feature bias determination service." The data-driven MLM feature bias determination service is implemented as executable instructions programmed and residing within memory and/or a non-transitory computer-readable (processor-readable) storage medium and executed by one or more processors of one or more devices. The processor(s) of the device(s) that executes the data-driven MLM feature bias determination service are specifically configured and programmed to process the data-driven MLM feature bias determination service. The data-driven MLM feature bias determination service has access to one or more network connections during its processing. The network connections can be wired, wireless, or a combination of wired and wireless.

In an embodiment, the device that executes the data-driven MLM feature bias determination service is cloud 110. In an embodiment, the device that executes the data-driven MLM feature bias determination service is server 110.

In an embodiment, the data-driven MLM feature bias determination service is all of, or some combination of bias analyzer 113, classification MLM 114, model bias analysis manager 115, and/or method 200.

The data-driven MLM feature bias determination service presents another and, in some ways, enhanced processing perspective from that which was discussed above with the method 200 of the FIG. 2.

In an embodiment, the data-driven MLM feature bias determination service is provided to a retail server 120 and/or a store server 130 as a SaaS.

At 310, the data-driven MLM feature bias determination service labels a first dataset with first sets of input data used by a first tenant as input to a data-driven MLM with a first tenant identifier for the first tenant.

At 320, the data-driven MLM feature bias determination service labels a second dataset with second sets of input data that is proposed to be used by a second tenant with a second tenant identifier for the second tenant.

At 330, the data-driven MLM feature bias determination service aggregates the first dataset with the second dataset within an aggregated dataset.

In an embodiment, at 331, the data-driven MLM feature bias determination service samples select input data labeled with the first tenant identifier from the first dataset and samples select input data labeled with the second tenant identifier from the second dataset when assembling the aggregated dataset.

In an embodiment of 331 and at 332, the data-driven MLM feature bias determination service balances first samples from the first dataset with second samples from the second dataset within the aggregated dataset.

At 340, the data-driven MLM feature bias determination service processes a classification MLM 114 that classifies the input data corresponding to the aggregated dataset as belonging to the first tenant identifier of the second tenant identifier.

In an embodiment of 332 and 340, at 341, the data-driven MLM feature bias determination service derives the classification MLM 114 by training a Random Forest classification MLM on the input data of the aggregated dataset as input to the Random Forest classification MLM with an expected output being one of the first tenant identifier or the second tenant identifier.

In an embodiment of 341 and at 342, the data-driven MLM feature bias determination service selects a portion of the aggregated dataset as a testing dataset and tests the Random Forest classification MLM after the training of 341 on the input data corresponding to the testing dataset to determine a total number of correctly classified input data with the corresponding first tenant identifier and the corresponding second tenant identifier identified by the Random Forest classification MLM following the testing.

At 350, the data-driven MLM feature bias determination service calculates an accuracy rate for the classification MLM 114 during 340.

In an embodiment of 342 and 350, at 351, the data-driven MLM feature bias determination service calculates the accuracy rate as the total number of the correctly classified input data by a total number of records in the testing dataset, each record represents a set of the corresponding input data.

At 360, the data-driven MLM feature bias determination service determines based on the accuracy rate whether the data-driven MLM is biased towards the first tenant or unbiased towards the first tenant in view of the second tenant.

In an embodiment of 351 and 360, at 361, the data-driven MLM feature bias determination service compares the accuracy rate to a threshold accuracy rate. When the accuracy rate is above the threshold accuracy rate, the data-driven MLM feature bias determination service provides an indication through an interface to a retailer that the data-driven MLM is biased towards the first tenant. When the accuracy rate is below the threshold accuracy rate, the data-driven MLM feature bias determination service provides the indication to the retailer through the interface that the data-driven MLM is unbiased between the first tenant and the second tenant.

In an embodiment of 361 and at 362, the data-driven MLM feature bias determination service provides with the indication one or more features of the input data corresponding to the first dataset that created a bias towards the first tenant based on one or more weights returned by the Random Forest classification MLM during 341 or 342 when boas was determined to be present based on 361 (the indication provided through the interface was bias being detected).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   obtaining a first dataset associated with first sets of input data used by a data-driven machine-learning model (MLM);
   obtaining a second dataset associated with second sets of input data that is proposed to be used with the data-driven MLM;
   labeling the first sets of input data with a first tenant identifier for a first tenant;
   labeling the second sets of input data with a second tenant identifier for a second tenant;
   aggregating the first dataset and the second dataset into an aggregated dataset;
   deriving a classification MLM to classify input data corresponding to the aggregated dataset as belonging to the first tenant identifier or the second tenant identifier;
   testing a portion of the input data corresponding to the aggregated dataset against the classification MLM for an accuracy rate in correctly identifying corresponding input data as belonging to the first tenant identifier or the second tenant identifier;
   wherein the accuracy rate is calculated as a total number of correctly classified input data divided by a total number of records in a testing dataset, each record represents a set of the corresponding input data;
   determining based on the accuracy rate whether the second dataset for the second tenant can be used with the data-driven MLM; and
   when the accuracy rate is above a threshold accuracy rate, providing one or more features of the input data corresponding to the first dataset that created a bias towards the first tenant based on one or more weights returned by the classification MLM, wherein the one or more features are used to adjust the data-driven MLM and provide future predictions that are not biased based on the one or more features.

2. The method of claim 1 further comprising, providing an interface to a retail server of a retailer for obtaining the first dataset and second dataset and for providing a determination for the determining.

3. The method of claim 1 further comprising, processing the method as a Software-as-a-Service (SaaS).

4. The method of claim 1, wherein aggregating further includes sampling the first dataset and sampling the second dataset and assembling the aggregated dataset.

5. The method of claim 4, wherein sampling further includes balancing first samples selected from the first dataset with second samples selected from the second dataset within the aggregated dataset.

6. The method of claim 5, wherein balancing further includes ensuring a first size of the first samples are balanced with a second size of the second samples within the aggregated dataset.

7. The method of claim 6, wherein ensuring further includes resampling from the first dataset and the second dataset and processing samples weighing to reach a balance within the aggregated dataset.

8. The method of claim 7, wherein deriving further includes training the classification MLM with the input data of the aggregated dataset as an input to the classification MLM and with a selection of one of the first tenant identifier and the second tenant identifier as an expected output from the classification MLM.

9. The method of claim 1, wherein testing further includes comparing the accuracy rate to a threshold accuracy rate.

10. The method of claim 9, wherein comparing further includes determining the data-driven MLM can be used with the second dataset of the second tenant when the accuracy rate falls below the threshold accuracy rate and determining the data-driven MLM cannot be used with the second dataset of the second tenant when the accuracy rate is at or above the threshold accuracy rate.

11. A method, comprising:
labeling a first dataset associated with first sets of input data used by a first tenant as input to a data-driven machine-learning model (MLM) with a first tenant identifier;
labeling a second dataset associated with second sets of input data proposed to be used by a second tenant as input to the data-driven MLM with a second tenant identifier;
aggregating the first dataset with the second dataset within an aggregated dataset;
processing a classification MLM that classifies input data corresponding to the aggregated dataset as belonging to the first tenant identifier or the second tenant identifier;
calculating an accuracy rate for the classification MLM during the processing;
wherein the accuracy rate is calculated as a total number of correctly classified input data divided by a total number of records in a testing dataset, each record represents a set of corresponding input data;
determining based on the accuracy rate whether the data-driven MLM is biased towards the first tenant or unbiased towards the first tenant in view of the second tenant; and
when the accuracy rate is above a threshold accuracy rate, providing one or more features of the input data corresponding to the first dataset that created a bias towards the first tenant based on one or more weights returned by the classification MLM, wherein the one or more features are used to adjust the data-driven MLM and provide future predictions that are not biased based on the one or more features or a set of features.

12. The method of claim 11, wherein aggregating further includes sampling select input data labeled with the first tenant identifier from the first dataset and select input data labeled with the second tenant identifier from the second dataset when assembling the aggregated dataset.

13. The method of claim 12, wherein sampling further includes balancing first samples from the first dataset with second samples from the second dataset within the aggregated dataset.

14. The method of claim 13, wherein processing further includes deriving the classification MLM by training a Random Forest classification MLM on the input data of the aggregated dataset as input to the Random Forest classification MLM with expected output being one of the first tenant identifier or the second tenant identifier.

15. The method of claim 14, wherein training further includes selecting a portion of the aggregated dataset as a testing dataset and testing the Random Forest classification MLM after the training on the input data corresponding to the testing dataset to determine a total number of correctly classified input data with the first tenant identifier and with the second tenant identifier identified by the Random Forest classification MLM following the testing of the Random Forest classification MLM.

16. The method of claim 15, wherein calculating further includes calculating the accuracy rate as the total number of correctly classified input data divided by a total number of records in the testing dataset, each record represents a set of corresponding input data.

17. The method of claim 16, wherein determining further includes comparing the accuracy rate against a threshold accuracy rate when the accuracy rate is above the threshold accuracy rate determining the data-driven MLM is biased towards the first tenant and when the accuracy rate is below the threshold accuracy rate determining the data-driven MLM is unbiased towards the first tenant, and providing an indication through an interface to a retailer that indicates whether the data-driven MLM is biased or unbiased towards the first tenant.

18. The method of claim 17 further comprising, providing with the indication one or more features of the input data corresponding to the first dataset that created a bias towards the first tenant based on one or more weights returned by the Random Forest classification MLM during the training or the testing for the one or more features when bias was determined from the comparing.

19. A system, comprising:
a cloud server comprising at least one processor and a non-transitory computer-readable storage medium;
the non-transitory computer-readable storage medium comprising executable instructions;
the executable instructions when provided to and executed by the at least one processor from the non-transitory computer-readable storage medium cause the at least one processor to perform operations comprising:
labeling first sets of input data from a first dataset with a first tenant identifier for a first tenant, each first set of input data used as input to a data-driven machine-learning model (MLM) associated with a retail service of a retailer, wherein the retail service provided by the retailer to the first tenant;
labeling second sets of input data from a second dataset with a second tenant identifier for a second tenant, each second set of input data being proposed as input to the data-driven MLM for the retailer to provide the retail service to the second tenant;
sampling the first dataset and the second dataset to create a training dataset;
training a classification MLM to classify each set of input data from the training dataset with a classification corresponding to the first tenant identifier of the second tenant identifier;
testing the classification MLM on a portion of the training dataset;
calculating an accuracy rate of the classification MLM based on results from the testing;
wherein the accuracy rate is calculated as a total number of correctly classified input data divided by a total number of records in a testing dataset, each record represents a set of corresponding input data;
providing an indication to the retailer through an interface as to whether the second tenant can be provided the retail service without any adjustment to the data-driven MLM or as to whether the data-driven MLM requires adjustments based on the accuracy rate; and when the accuracy rate is above a threshold accuracy rate, providing one or more features of input data corresponding to the first dataset that created a bias towards the first tenant based on one or more weights returned by the classification MLM, wherein the one or more features are used to adjust the data-driven MLM and provide future predictions that are not biased based on the one or more features or a set of the one or more features.

20. The system of claim 19, wherein the first tenant is a single device, or a plurality of devices associated with a store of the retailer, wherein the second tenant is a different single device, or a different plurality of devices associated with a different store of the retailer.

* * * * *